Figure 1:
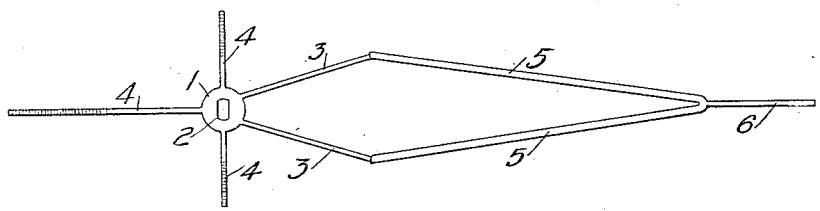

E. WESTON.
INDEX NEEDLE OR HAND FOR USE WITH ELECTRICAL MEASURING INSTRUMENTS.
APPLICATION FILED MAR. 7, 1913.

1,070,311.  Patented Aug. 12, 1913.

WITNESSES

INVENTOR
Edward Weston
BY Charles J. Kintner
ATTORNEY

UNITED STATES PATENT OFFICE.

EDWARD WESTON, OF NEWARK, NEW JERSEY, ASSIGNOR TO WESTON ELECTRICAL INSTRUMENT COMPANY, OF WAVERLY PARK, NEW JERSEY, A CORPORATION OF NEW JERSEY.

INDEX NEEDLE OR HAND FOR USE WITH ELECTRICAL MEASURING INSTRUMENTS.

1,070,311.　　　　Specification of Letters Patent.　　Patented Aug. 12, 1913.

Original application filed November 9, 1909, Serial No. 527,092. Divided and this application filed March 7, 1913. Serial No. 752,533.

*To all whom it may concern:*

Be it known that I, EDWARD WESTON, a subject of the King of Great Britain, and resident of Newark, county of Essex, and State of New Jersey, have made a new and useful Invention in Index Needles or Hands for Use with Electrical Measuring Instruments, of which the following is a specification.

My invention relates to a new form of index needle or hand designed for use with electrical measuring instruments, and it has for its object, to overcome certain serious difficulties now and heretofore encountered in accurately measuring electrical or magnetic quantities by instruments in those cases where the value or direction of the forces rapidly fluctuate or change; such, for instance, as are used in measuring pulsating or alternating currents of varying frequencies. In measuring such forces, we are often confronted with the fact that in much practical work and in research the rate of change of direction of the forces, and also the magnitude thereof, are likely to vary within exceedingly wide limits. To illustrate, the frequency of the current (or change of direction thereof) often varies in practical work in using alternating currents from about 15 cycles to 500 cycles per second, although in research work these limits are frequently much extended. It is, therefore, highly important to be able to make electrical or other measuring instruments intended for use on pulsating or alternating current circuits which will accurately indicate the value of the forces acting, no matter what the frequency may be within reasonable limits, and no matter how great the fluctuation in the values of such forces may be within reasonable limits.

The purpose of my improved needle is to overcome a serious inherent defect in all electrical measuring instruments which have to be used on electrical circuits in which either pulsating or alternating currents are used. Heretofore, in such electrical measuring instruments the needle either gets into vibration in unison with the rate of pulsation or the rate of alternation of the current to such an extent as to make it either altogether impossible to see the vibrating end thereof or else to make it extremely difficult or impossible to determine the exact position of the same, with respect to the values marked upon the scales of said instruments. Or else the needle will get into vibration in response to some harmonic of the rate of pulsation, or some harmonic of the rate of alternation of the current on said circuits. If the needle responds to the said harmonics its end also becomes either invisible or else it becomes very difficult or impossible to determine the true position of the end thereof with respect to the values marked on the scale. I first discovered these facts and then invented a form of needle the natural period of vibration of which is so very high that it neither vibrates in unison with the rate of pulsation or the rate of alternation of the current; nor does it vibrate in unison with any harmonics of said rates of pulsation or alternation of the current. Of course, the natural period of vibration of a needle can be raised by adding metal to the same; that is by stiffening it by the addition of more metal. But that would be fatal to the accuracy of the instrument from another cause, and would seriously impair its durability. Adding metal to the needle to increase the stiffness (and thus increase its natural period of vibration) would add to the inertia of the moving system of the instrument and would thus reduce its power to show the true value of fluctuating currents on the circuit, because the needle and the remainder of the moving system would then lag behind the changes in values of the fluctuating current. But adding metal to the needle in order to increase the stiffness of the needle and therefore its natural period of vibration, also increases the momentum thereof; and this would cause the needle to swing beyond the point of the true value of the fluctuation of the current, and thus give a false indication of the fluctuating current value. Moreover the added weight of metal needed to secure the stiffness required to raise the natural period of vibration sufficiently, adds weight to the moving system, and as this weight is all carried by the delicate pivots and jewel bearings of such instruments; consequently, the wear and tear on said pivots and jewel bearings is greatly increased. The effect is to greatly reduce the life or period of useful service of the instrument. But I have found that the wear and tear on the pivots and jewels is not proportional to the load imposed on them in such instruments, but is approximately proportional to the square of the load; hence, my new needle is of great practical value in all these ways. My invention overcomes these difficulties and by its use I am able to make instruments for use on alternating current circuits of all the widely varying frequencies within the limits of engineering practice in which the moving parts and index needles or hands carried thereby are entirely or practically entirely free from resonant vibration and, therefore, the exact position of the pointer tip of the needle or hand over the scale can be accurately determined and the true value of the force or forces acting be easily ascertained, no matter what the frequency may be or how violent or sudden the change in value of the force or forces may be.

Figure 2:
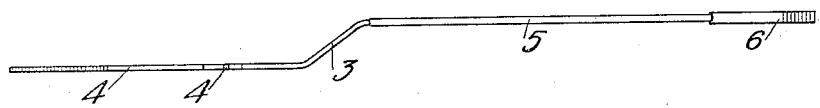

For a full and clear understanding of my invention, such as will enable others skilled in the art to construct and use the same, reference is had to the accompanying drawing, in which, Figure 1 is a plan view of the simplest form of my index needle or hand; and Fig. 2 is a side elevational view thereof, as seen looking at Fig. 1 from the bottom toward the top of the drawing.

Referring now to the drawings in detail, 1 represents a balance cross or member having at its center an elongated staff opening 2 and provided with screw-threaded counter-balance or weight supporting arms 4, 4, 4, and two additional diverging arms or members 3, 3; this structural device being preferably stamped out, at one operation, of a light sheet of metal, such as aluminum.

5, 5, represent converging angular members made preferably of finely drawn tubing of aluminum. These two members are preferably formed from one continuous piece of tubing bent back at its middle upon itself and then flattened as shown and cemented between the adjoining flattened faces, thus constituting an integral part of the converging members 5, although these members might be distinct at their ends and jointed together by cement, or in any preferred way. The arms or members 3 may be in one plane or they may be bent upward, as shown in Fig. 2, so as to assume angular relations in different planes and these diverging members 3 are then joined to the converging members 5 by slipping the tubular ends of the latter over the ends of the former, first having coated the ends of the members 3, 3 with the necessary cement so as to effect a good union of the parts. Afterward they may be permanently secured together by staking or indenting the ends of the converging members 5, 5 with a prick-punch. The outer ends of the counter balance or weight supporting arms 4, 4 are provided with very fine screw-threads, as shown, after which the usual counter weights are secured thereto and adjusted so as to properly balance the needle when the same is attached to the instrument staff adapted to be inserted in the opening 2. I have ascertained that such a needle may be made extremely light and that the trussed arrangement thereof, which is produced by the balance cross or member, 1, diverging members 3, 3 and converging members 5, 5, make it practically impossible for the same to vibrate in unison with the fundamental period of pulsation or of change in frequency of the current being measured, or with any harmonic of said fundamental.

I make no claim broadly in the present application to a trussed needle embracing a plurality of diverging and converging members separated from and rigidly secured to each other; nor broadly to an index needle possessing the characteristics hereinbefore referred to by which resonant vibration are prevented through the agency of such members so related, as claims to this subject matter are based upon structures disclosed in a prior application filed by me in the U. S. Patent Office on the 9th day of November, 1909, and bearing Serial No. 527,098, of which this application is a division.

Having thus described my invention what I claim and desire to secure by Letters Patent of the United States is:—

1. An index needle or hand for an electrical measuring instrument embracing two converging members connected together at one end and flattened and held together at that point so as to constitute an indicator or pointer tip, said members being connected at their other ends to a fork or balance cross.

2. An index needle or hand for an electrical measuring instrument embracing two converging members connected together and flattened so as to constitute an indicator or pointer tip, said members being connected at their other ends to a common support; together with a plurality of counter-weight arms for counter balancing the before-mentioned parts.

3. An index needle or hand embracing a balance cross and diverging and converging members, the latter being connected together and flattened so as to constitute a pointer tip.

4. An index or hand embracing a balance cross provided with a plurality of counter-weight arms and diverging and converging members, the latter being flattened at their free ends so as to constitute a pointer tip.

5. An index needle or hand embracing a balance cross provided with a plurality of counter-weight arms and diverging and converging members, the latter being provided with a flattened pointer tip, substantially as shown.

6. An index needle or hand for electrical measuring instruments having a plurality of converging tubular members and a flattened pointed tip integral with the outer ends of said members, substantially as described.

7. An index needle or hand for electrical measuring instruments having a balance cross or member, a plurality of diverging and converging members carried thereby, and a flattened pointer tip integral with the outer ends of said members, substantially as described.

In testimony whereof I have signed my name to this specification in the presence of two subscribing witnesses.

EDWARD WESTON.

Witnesses:
 Edw. Y. Weston,
 C. J. Kintner.